Figure 2:
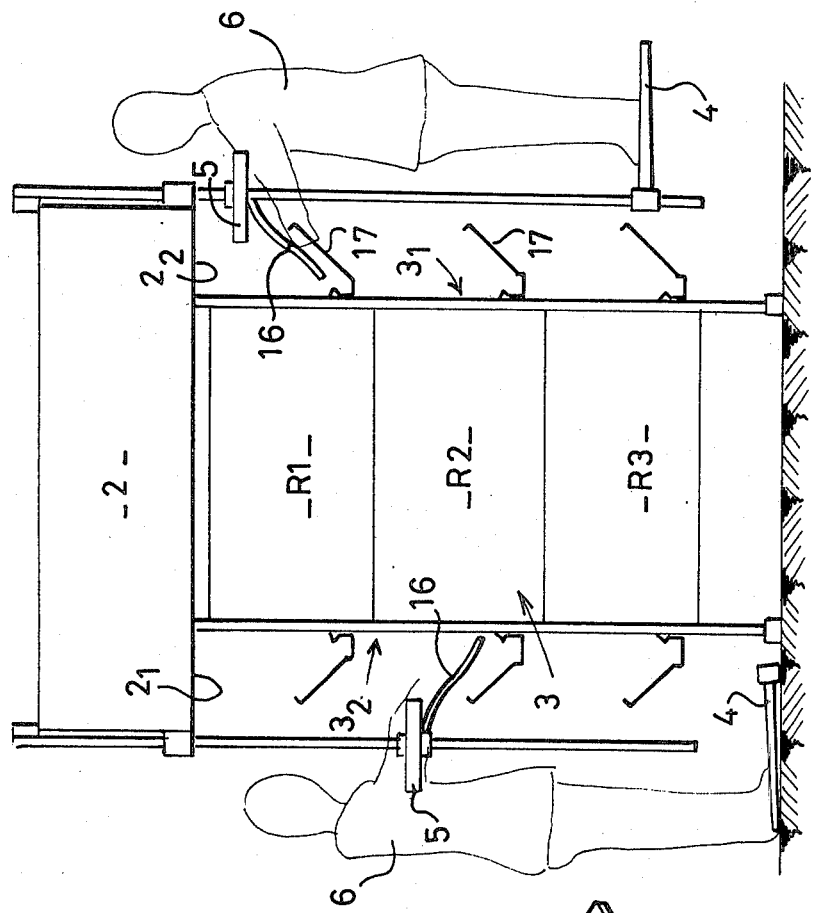

United States Patent [19]

Danno et al.

[11] Patent Number: 4,473,030
[45] Date of Patent: Sep. 25, 1984

[54] ARTIFICAL INSEMINATION APPARATUS INCLUDING A STAND FOR USE WITH A BATTERY OF CAGES

[76] Inventors: Louis Danno, Bel Orient, L'Hermitage-Lorges 22; Maurice Danno, Launoy Guen, Plemet 22, both of France

[21] Appl. No.: 426,073

[22] Filed: Sep. 28, 1982

[30] Foreign Application Priority Data

Jul. 20, 1982 [FR] France .............................. 82 12633

[51] Int. Cl.³ ........................................... A01K 45/00
[52] U.S. Cl. .................................... 119/21; 119/97 R
[58] Field of Search ............... 119/21, 97 R; 182/150, 182/36, 38, 39

[56] References Cited

U.S. PATENT DOCUMENTS 3,312,194  4/1967  Ernst .............................. 119/52 AF
3,825,098  7/1974  Shingler .............................. 182/106
3,880,122  4/1975  Randolph et al. ................. 119/97 R Primary Examiner—Hugh R. Chamblee
Attorney, Agent, or Firm—Kenyon & Kenyon

[57] ABSTRACT

The invention relates to artificial insemination apparatus, and more particularly to a stand for use with a battery of cages used in rearing and breading poultry such as hens, guinea fowl, turkeys, pheasants, and other domestic or reared birds of animals.

In accordance with the invention, the stand comprises a support removably fixed on one side or the other of the battery to a moving trolley, the support bearing a platform for bearing an operator at an adjustable height, to facilitate his work on rows at different heights, and a tray also adjustable in height for receiving instruments and material for use in the insemination operation.

The invention is applicable to the insemination of animals contained in a battery of cages.

8 Claims, 2 Drawing Figures

U.S. Patent  Sep. 25, 1984  4,473,030

ARTIFICAL INSEMINATION APPARATUS INCLUDING A STAND FOR USE WITH A BATTERY OF CAGES

This invention relates to apparatus for use in artificial insemination, comprising a battery of cages for containing animals being reared and bred, especially poultry such as hens, guinea fowl, turkeys, pheasants and other domestic or reared animals.

In rearing and breading such animals, batteries of cages may be used which are in the form of superimposed rows of juxtaposed cages at different levels forming elongate arrays whose two longitudinal faces are provided with cage doors which are accessible from outside, and slide or hinge, for example. Such a battery of cages may also comprise a trough extending along each row of cages, the troughs being supplied with fodder and/or medical substances from a trolley hanging over the battery to distribute the substances into the troughs on each side of the battery. The trolley may be displaced continuously or intermittently along the battery by an electrical or other drive controlled manually by the operator.

The present invention has an object to provide support means facilitating the work of the operator at each of the cages. During the insemination operation, the operator takes an animal, attaches it, inseminates it and replaces it loose in its cage. The support means of the present invention is adapted to these manipulations, and specifically gives the battery of cages a work stand enabling the operator to work in satisfactory conditions on different levels of cages.

The present invention provides apparatus for use in artificial insemination comprising a battery of cages for containing animals being reared and bred, said battery comprising superimposed rows of juxtaposed cages, continuous troughs extending along said rows for presenting substances to be consumed by the animals in the cages, trolley means supported on said battery of cages for supplying said substances to said troughs, drive means for displacing said trolley means along said rows of cages, manually actuable control means for intermittently actuating said drive means to displace said trolley means, and support means comprising a support member, fixing means for removably fixing said support means on said trolley means in facing relationship with cages on a side of said battery, a platform for bearing an operator, adjustable platform mount means for securing said platform at an adjustable height on said support member, tray means for receiving instruments and material for use in artificial insemination of an animal from a cage, and adjustable tray mount means for securing said tray at an adjustable height on said support member.

In a preferred embodiment of the invention, said fixing means comprises a crossmember to which said support member is secured, and hook means for hooking said crossmember to said trolley means.

Figure 1:
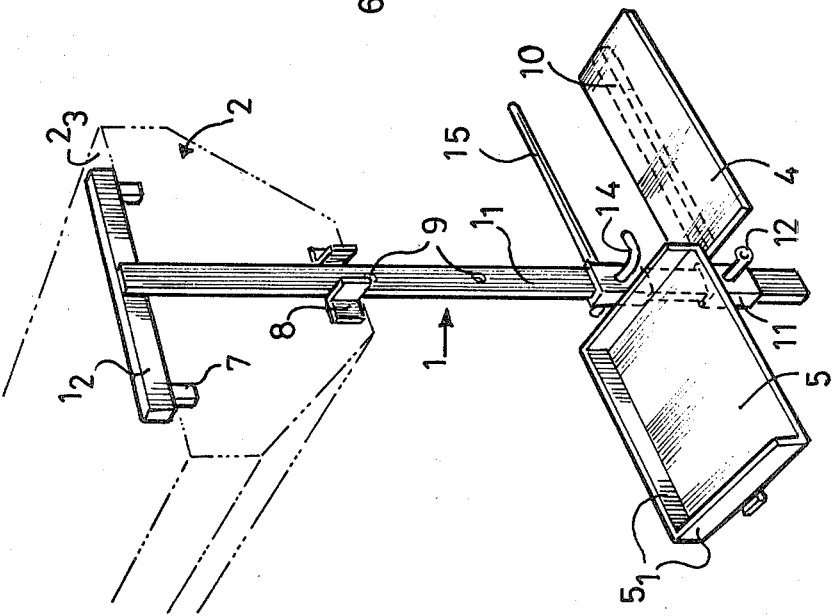

Other features and advantages of the invention will appear from the following description of embodiments thereof, given by way of example with reference to the accompanying drawings, in which:

FIG. 1 is a perspective view of an artificial insemination stand in accordance with the invention; and FIG. 2 is a diagrammatic end view of a battery of cages showing stands in two out of three positions of use.

As shown in the accompanying drawings, the artificial insemination stand comprises generally a support 1 of generally T shape which is removably secured to a supply trolley 2 which moves parallel to the battery of cages 3, the main upright 1 of the support serving as a slider for a platform or seat 4 which can be adjusted for height to positions corresponding to the rows R1, R2 and R3 of cages in the battery 3. The upright 1 also serves as a slider for a tray which receives equipment and instruments for use by the operator (who is indicated diagrammatically at 6 in FIG. 2).

In more detail, the support comprises an upright 1, as mentioned above, which is in the form of a metal bar of rectangular section, for example, the bar being connected to a cross member 1, which extends perpendicularly to the upright, the crossmember comprising two hooked fingers 7 projecting from its underneath face and which hook into mating orifices in the upper face 2, of the trolley 2 adjacent the side of the trolley, for example. The upright 1 is maintained vertical by the action of two lugs 8, in the shape of corners, having respective arms welded, rivetted or bolted to the side face of the trolley. The projecting arms of the lugs, by maintaining the upright vertical, avoid the hooks 7 coming unhooked. Lastly the upright 1 comprises orifices 9 extending right through the upright, there being four orifices in this example, spaced by distances corresponding substantially to the height of each row of cages.

The seat or footboard 4 is in the form of a plate secured to a crossmember 10 by screws or bolts, the crossmember being solid with a sleeve 11 whose section mates with the upright 1 so that the sleeve can slide and be guided by the upright, a pin 12 enabling the plate 4 to be fixed in the desired position by inserting the pin in the relevant one of the orifices 9.

The tray 5 also takes the form of a plate and three of the edges 5, of the plate are raised at right angles, the plate is also solid with a sleeve 13 similar to the sleeve 11 which can be fixed at a desired position on the upright 1 by a pin 14.

The sleeve 13 also receives a crossmember 15 on which is fixed a board 16 (FIG. 2) in the form of a chute. The chute is inclined downwards towards a chosen one of the cages, and receives animals to be inseminated, and is provided with means (not shown) for constraining and retaining the animals, which grip the feet of the animals so as to hold them prisoner during the artificial insemination, after which they are let loose, the shape of the board, like a chute or slide, ensuring that the animals go back into the respective cage.

The stand of this embodiment of the invention is hooked onto the trolley for distributing eggs and moves with the trolley; the trolley runs along the line of cages with a continuous or intermittent motion. The details of the means for moving and controlling the trolley will not be described, as suitable means are available to those skilled in the art; the trolley may be displaced by a piston and cylinder device, a chain, or a belt for example. The operator 6 is provided with a press button control enabling him to control intermittent movement of the trolley when he wishes to move from one cage to the next after the artificial insemination operation is completed.

As shown in FIG. 2, the battery of cages 3 comprises three double superposed rows of cages R1, R2 and R3, the cages being contiguous with the neighbouring cages to form an elongate parallelopiped array; the doors of the cages may be sliding or hinged doors accessible from the outside of the respective longitudinal side $3_1$, $3_2$ of the battery. The two longitudinal sides $3_1$ and $3_2$ are provided with respective troughs 17 extending along the battery and allowing the birds to feed from the troughs by passing their heads and necks through the bars of the cages. The supply trolley 2, used to distribute fodder products and/or medicinal substances, hangs over the battery of cages and projects on each longitudinal side $3_1$, $3_2$ of the battery so that substances can be poured from its projecting edges $2_1$, $2_2$ into the troughs 17.

It will be seen in FIG. 2 that the insemination stand is removably secured to the end faces of the trolley, the trolley moving parallel to the longitudinal sides of the battery and accordingly displacing with it the insemination stand attached to it.

It will be understood that, during the period of insemination, the supply trolley 2 does not distribute food and is used only as a means of moving the stand. From a functional point of view, in order to inseminate the top row R1, the operator will position the platform 4 at its lowest position so as to be able to work standing up, as shown in the drawing. In this position, the tray 5 and the board-chute 16 will be placed in their topmost position so as to present for the operator's use the instruments and material needed for insemination, the board 16 being placed facing the opening of the relevant cage when the door has been opened. This position is shown on the right in FIG. 2.

The insemination of the middle row R2 is performed with the platform 4 removed for subsequent re-use, the tray 5 and board 16 being brought to an intermediate position, as shown on the left in FIG. 2.

The insemination of the bottom row R3 is performed with the operator seated on the platform 4, which is placed in the same position used for the top row R1, but with the tray 5 and the board 16 brought down facing the row R3.

In each case, the inseminator opens the cage door, takes one or more birds from the cage and positions them on the insemination table 16, attaches them by the usual foot-grips and performs the insemination. When the operation has been performed, he releases the grips to free the birds which simply slide back down into the relevant cage. The operator then presses the control button of the feeder or supply trolley 2 to displace it by the width of a cage (about 50 cm) so as to be ready for the next insemination.

When the insemination of all the cages of a given face or longitudinal side 31 has been performed, the operator unhooks the insemination stand by simply moving it angularly upwards and then fixed it on the opposite face or longitudinal side and continues as before.

The semi-automatic control gives a significant gain in time and consequently enables a single operator to do the work where two or three operators were otherwise needed. Moreover the inseminator works in satisfactory conditions since all the instruments birds and attachment means are close to hand during the insemination operation, the return of the birds to their cages being performed automatically under gravity without distressing the animals.

We claim:

1. Apparatus for use in artificial insemination comprising a battery of cages for containing animals, said battery comprising superimposed rows of juxtaposed cages, continuous troughs extending along said rows for presenting substances to be consumed by the animals in the cages, trolley means displaceable along said rows of cages supported on said battery of cages for supplying said substances to said troughs, and support means comprising a support member, fixing means for removably fixing said support means on said trolley means in facing relationship with cages on a side of said battery, a platform for bearing an operator, adjustable platform mount means for securing said platform at an adjustable height on said support member, tray means for receiving instruments and material for use in artificial insemination of an animal from a cage, and adjustable tray mount means for securing said tray at an adjustable height on said support member.

2. Apparatus as claimed in claim 1 wherein said tray means comprises a plate with upstanding edges forming a receptacle.

3. Apparatus as claimed in claim 1 wherein said tray mount means also comprises a crossmember, the apparatus including a board for securing to the crossmember of said tray mount means in a position extending towards a cage, to bear an animal during artificial insemination.

4. Apparatus as claimed in claim 1 wherein said battery presents cages on first and second opposite longitudinal sides of the battery, respective sides of said trolley means projecting over each of said first and second sides of said battery, and said fixing means enabling said support means to be fixed alternatively on said sides of said trolley means, whereby to work both sides of said battery.

5. Apparatus as claimed in claim 1 wherein said battery comprises at least lower, middle and upper rows of cages and wherein said platform mount means enables said platform to be positioned so that an operator can work on said upper and lower rows of cages respectively standing up and seated on said platform, said tray mount means enabling said tray means to be positioned at different heights corresponding to said lower, middle and upper rows so as to be close at hand for the operator when he is working on the respective rows.

6. Apparatus as claimed in claim 1 wherein said fixing means comprises a crossmember to which said support member is secured, and hook means for hooking said crossmember to said trolley means.

7. Apparatus as claimed in claim 6 wherein said fixing means includes lateral guide means for maintaining said support means in a vertical position.

8. Apparatus as claimed in claim 1 or 6 wherein said support member comprises an upright member, and said platform and tray mount means comprises respective sleeves for positioning slidingly on said support member, said upright and sleeves having cooperating orifices and said mount means including pins for securing said sleeves on said support member by said orifices.

* * * * *